2,792,344
METHANOL PURIFICATION

Paul W. Tidwell, Texas City, Tex., assignor of one-half to Monsanto Chemical Company, St. Louis, Mo., a corporation of Delaware, and one-half to Heyden Chemical Corporation, New York, N. Y., a corporation of Delaware No Drawing. Application December 14, 1953, Serial No. 398,210

2 Claims. (Cl. 210—38)

This invention relates to an improved process for the purification of synthetic methanol. More particularly, it pertains to the removal of iron and manganese ions from crude methanol by means of ion exchange employing cation exchangers of the sulfonic acid type.

In order to meet the rigid specifications prescribed for pure methanol, it is necessary that all traces of impurities be removed from the alcohol. This is particularly true with regard to those oxidizable impurities, i. e., carbonyl impurities of an aldehydic or ketonic nature, which give the methanol objectionable odor and prevent it from meeting specifications. Many methods have been proposed and developed for treating the crude methanol produced synthetically by hydrogenation of carbon monoxide to free it of all such oxidizable impurities. Among the more successful processes thus developed and in commercial use is that which consists of the several steps of treating the crude methanol with sulfuric acid and potassium permanganate, neutralizing the excess acid present, and then distilling the thus treated material to recover the pure methanol. In this process, however, the presence of iron impurities which are common in the crude methanol from commercial synthetic processes and manganese ions resulting from the reduction of the permanganate causes some difficulties. When the excess acid is neutralized as described above, a finely divided precipitate of hydrated iron and manganous oxides is thrown down which is extremely difficult to filter out and it is impractical to feed material of such solids content to a distillation system.

It is an object of the present invention, therefore, to provide an improved process for the purification of methanol.

It is a further object of the invention to provide a process for removing iron and manganese ions from crude methanol.

Other objects and advantages will become apparent from the following description of the invention.

According to the invention, methanol containing iron and/or manganese ions is freed of such contaminants by contacting it with a strongly acidic cation exchange resin. The iron and manganese ions present are taken up on the resin while the methanol passes through. By this method, the difficulties in the above-described purification method may be overcome. After passage through the ion exchange column, the acid- and permanganate-treated methanol may be neutralized without any attendant precipitation of troublesome iron and manganese compounds. The crude methanol can then be readily and efficiently distilled to yield a pure product which meets all specifications.

The following examples will serve to illustrate the invention but are not to be construed as limiting it in any manner.

Example I

About 0.3 ml. of concentrated sulfuric acid was added, with stirring, to a 500-ml. sample of crude methanol which was known to contain from 10–12 p. p. m. iron. About 1.7 ml. of a 6% potassium permanganate solution was then stirred vigorously into the acid-treated methanol and the mixture was then allowed to stand for a period of 20 minutes. At the end of this time, the contents of the flask were neutralized to a pH of 7 by the addition of a 25% solution of caustic. Upon neutralization, a very finely divided, brown-colored, flocculent-type precipitate was formed which resisted all attempts at filtration. The precipitate went through the finest of filter paper (Whatman's No. 50 and No. 1), passed readily through a fine fritted crucible, and was not removed by filtration through a sand bed or through charcoal.

Example II

A sample of crude methanol (500 ml.) in a flask was agitated with 0.275 ml. of concentrated sulfuric acid. Approximately 1.67 ml. of a 6% solution of potassium permanganate was added to the acid-treated methanol. The mixture was stirred thoroughly and then allowed to stand for about 20 minutes. The contents of the flask were then passed through a bed of a cation exchange resin of the sulfonic acid type known to the trade as "Dowex 50" or "Nalcite HCR." The resin bed was 0.35 sq. in. in cross section and 30 in. deep and flow rate of the liquid was approximately 47 cc./min., a rate equivalent to 2 gallons per minute per cubic foot of resin. The effluent was collected in a flask and neutralized to a pH of 7 by the addition of 25% caustic. No precipitate resembling that which was formed in Example I was formed upon neutralization. Only a small amount of $Na_2SO_4$ was precipitated from solution. The solution was distilled in a 30-plate fractionating column at a reflux ratio of about 2:1 and methanol was recovered overhead at a temperature of 64–65° C. This methanol product met substantially all Federal specifications for "grade A" methanol and hence had an iron content of less than 0.08 p. p. m.

Example III

In order to further determine the efficiency of the ion exchange treatment, a 500-ml. sample of crude methanol containing 0.046 p. p. m. of iron was "doctored" by the addition of enough iron pentacarbonyl to bring the concentration of iron in the solution up to approximately 10 p. p. m. A small amount of concentrated sulfuric acid (0.28 ml.) was stirred into this solution after which 1.67 ml. of a 6% solution of potassium permanganate was added, also with stirring. This mixture which had a pH in the range from 1.0 to 1.5 was then allowed to stand for 20 minutes.

The solution was then passed through an ion exchange column about 1.1 cm. in diameter packed with a sulfonic acid type cation exchange resin to a depth of approximately 76 cm. The resin, a sulfonated copolymer of styrene and divinylbenzene known to the trade as "Dowex 50" or "Nalcite HCR" had previously been regenerated with 10% sulfuric acid, rinsed acid-free with water, and rinsed again with C. P. methanol to displace the water. Flow rate for passage of the methanol solution through the resin bed was approximately 15 cc./min. which is equivalent to a rate of 2 gallons per minute per cubic foot of resin.

The effluent from the column was analyzed for iron by the thiocyanate method and found to contain none. There was also no evidence of the fine brown-colored precipitate noted in Example I when the effluent was neutralized to a pH of 7.9 by means of 5% caustic. The neutralized solution was transferred to a one-liter flask containing 100 ml. of water and the methanol-water solution was distilled in a 40-plate Oldershaw fractionating column. The column was held on total reflux until the overhead temperature reached 64° C. and then methanol was taken overhead at a 2:1 reflux ratio. This purified methanol had essentially no iron present and met all Federal specifications for "grade A" methanol.

This process of purification by ion exchange may be carried out by either column or batch techniques. In general, column operation is favored, since practically quantitative exchange may be achieved employing this method.

Any ion exchange resin deriving its activity from strongly acidic groups, capable of being highly ionized and having little affinity for the hydrogen ion may be employed. The resin should contain active groups having an acid strength approximately equal to that of sulfuric acid and with only the hydrogen ions of the resin free to move into solution. Commercial synthetic resin adsorbents of the sulfonic acid type, particularly sulfonated polymers and copolymers of styrene, are, in general, suitable for use in the invention. The sulfonated resin reacts with the iron and manganese to exchange hydrogen for the iron and manganese ions in the methanol. In the process of the invention, the cation exchangers are employed on the hydrogen cycle and hence, if supplied commercially in the sodium form, the resin may be readily converted to the acid form by regeneration with sulfuric acid.

Choice of an optimum resin bed depth in column operation is contingent upon such factors as equipment design, quantities of materials to be handled, concentration of impurities to be removed, rate of flow, etc. A minimum bed depth of 24 inches is desirable and bed depths of from 24 in. to 60 in. are generally employed.

The temperature of the methanol solution being treated is maintained at ordinary atmospheric temperature for best results. Temperatures up to 60° C. may be employed but no particular advantage is achieved by heating.

The rate of passage through the resin bed may be varied depending upon the concentration of iron and manganese in the methanol. Since such impurities are usually present only in trace quantities, i. e., up to about 20 parts of iron and/or manganese per million parts of methanol, a rate of 2 gallons per cubic foot of resin per minute is generally satisfactory. Slower rates increase the efficiency of the separation somewhat. Faster rates may be employed but since essentially all the iron and manganese present must be removed, too rapid rates, i. e., those in excess of 5 gallons per cubic foot of resin per minute are to be avoided.

The cation exchange resins employed in the invention may be re-used again and again in cyclic operations. Efficient regeneration is achieved after the exhaustion step by treating the bed with a 5 to 10% solution of sulfuric acid at a flow rate of one gallon per minute per cubic foot of resin, followed by rinsing free of excess acid with distilled water, and finally rinsing with methanol to displace the rinse water.

What is claimed is:

1. In a process for the purification of crude synthetic methanol which consists of treating said methanol with sulfuric acid and potassium permanganate, neutralizing the excess acid present with an alkali metal hydroxide, and distilling the thus treated methanol, the improvement which comprises contacting the acid- and permanganate-treated methanol with a strongly acidic cation exchange material operating on the hydrogen cycle to remove the iron and manganese ions present prior to the neutralization step.

2. In a process for the purification of crude methanol which consists of treating said methanol with sulfuric acid and potassium permanganate, neutralizing the excess acid present with an alkali metal hydroxide, and distilling the thus treated methanol, the improvement which comprises contacting the acid- and permanganate-treated methanol with a cation exchange material of the sulfonic acid type to remove the iron and manganese ions present prior to the neutralization step.

References Cited in the file of this patent
UNITED STATES PATENTS

| Number | Name | Date |
|---|---|---|
| 1,192,075 | Kriegsheim | July 25, 1916 |
| 2,366,007 | D'Alelio | Dec. 26, 1944 |
| 2,520,189 | Zarow | Aug. 29, 1950 |
| 2,615,924 | Reents | Oct. 28, 1952 |
| 2,628,193 | D'Alelio | Feb. 10, 1953 |
| 2,628,986 | Wallace et al. | Feb. 17, 1953 |
| 2,641,543 | Unger et al. | June 9, 1953 |
| 2,667,514 | Fuqua | Jan. 26, 1954 |
| 2,671,059 | Smit | Mar. 2, 1954 |
| 2,676,923 | Young | Apr. 27, 1954 |